Oct. 21, 1952 J. G. HAWLEY 2,614,662
SINGLE-DISK SPOT-TYPE BRAKE WITH ONE POINT ADJUSTMENT
Filed Nov. 25, 1949 5 Sheets-Sheet 1

Inventor
Jesse G. Hawley
By
Oldham & Oldham
ATTORNEYS

Oct. 21, 1952    J. G. HAWLEY    2,614,662
SINGLE-DISK SPOT-TYPE BRAKE WITH ONE POINT ADJUSTMENT
Filed Nov. 25, 1949    5 Sheets-Sheet 3

INVENTOR.
Jesse G. Hawley
BY
Oldham & Oldham
ATTORNEYS

Oct. 21, 1952          J. G. HAWLEY          2,614,662
SINGLE-DISK SPOT-TYPE BRAKE WITH ONE POINT ADJUSTMENT
Filed Nov. 25, 1949          5 Sheets-Sheet 4
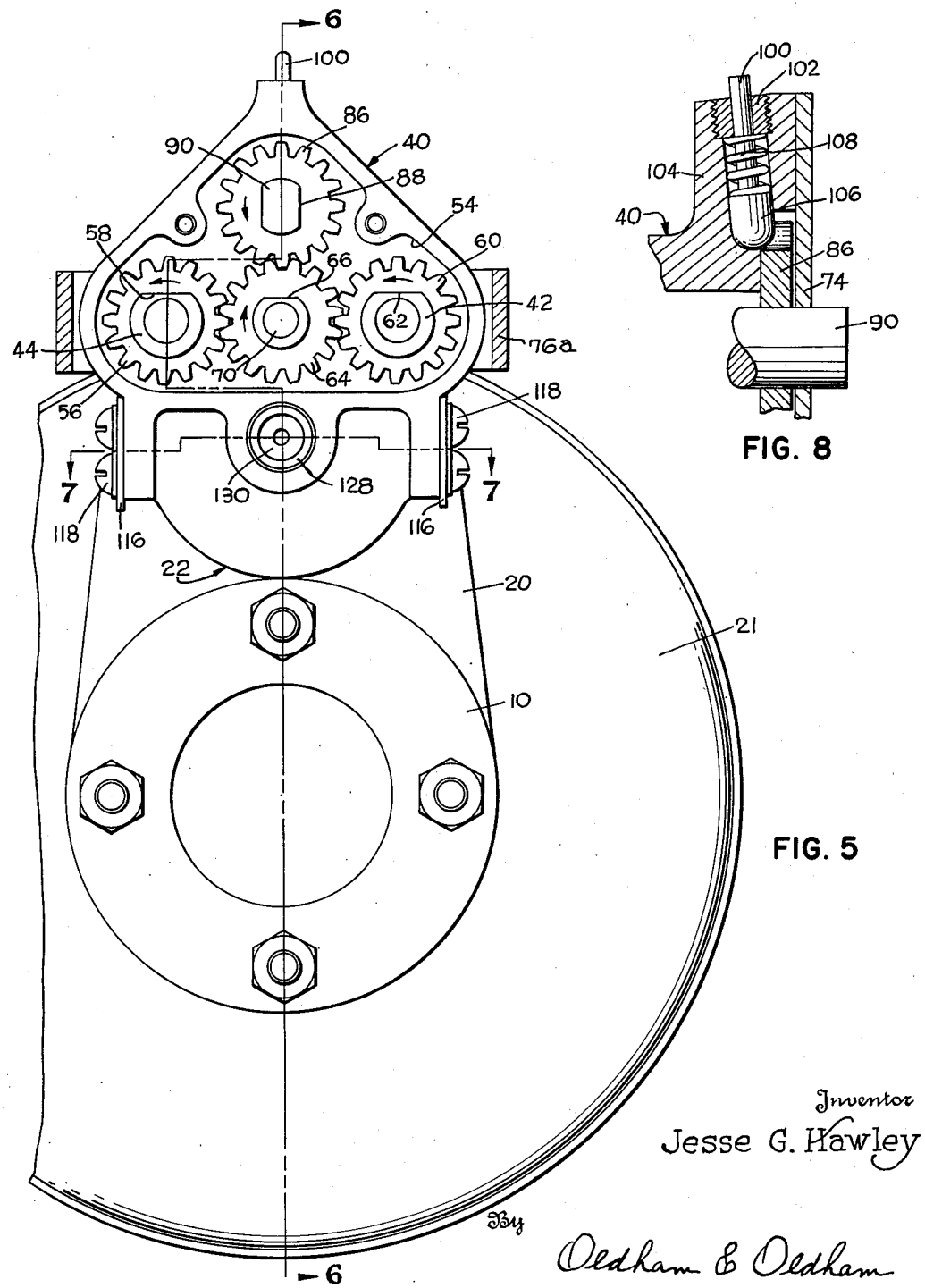
Inventor
Jesse G. Hawley
By
Oldham & Oldham
ATTORNEYS Oct. 21, 1952  J. G. HAWLEY  2,614,662
SINGLE-DISK SPOT-TYPE BRAKE WITH ONE POINT ADJUSTMENT
Filed Nov. 25, 1949  5 Sheets-Sheet 5
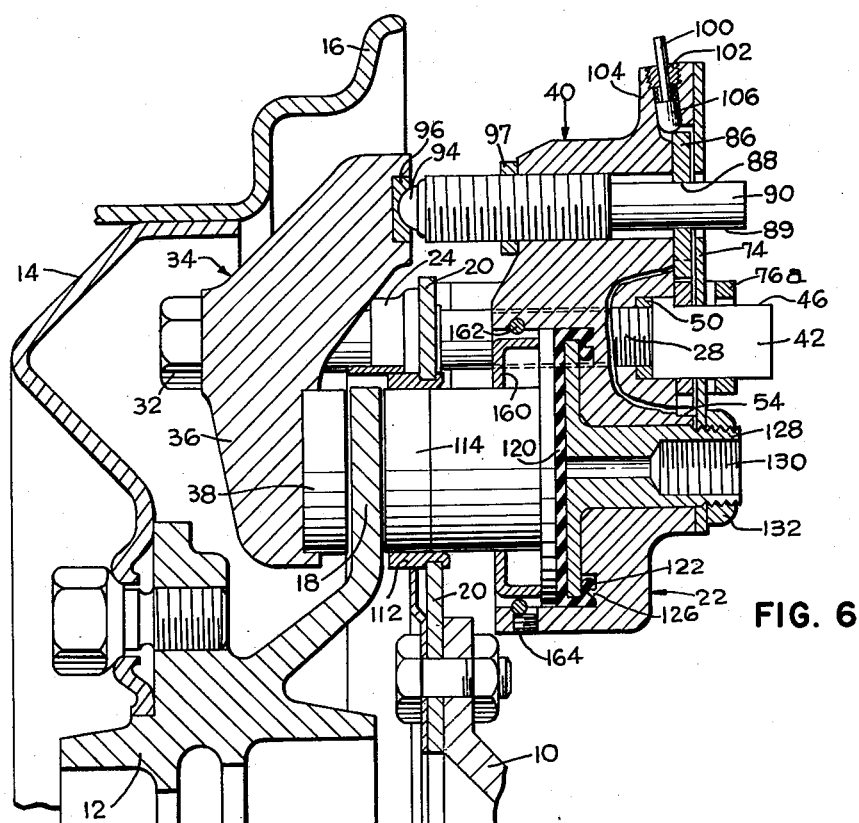
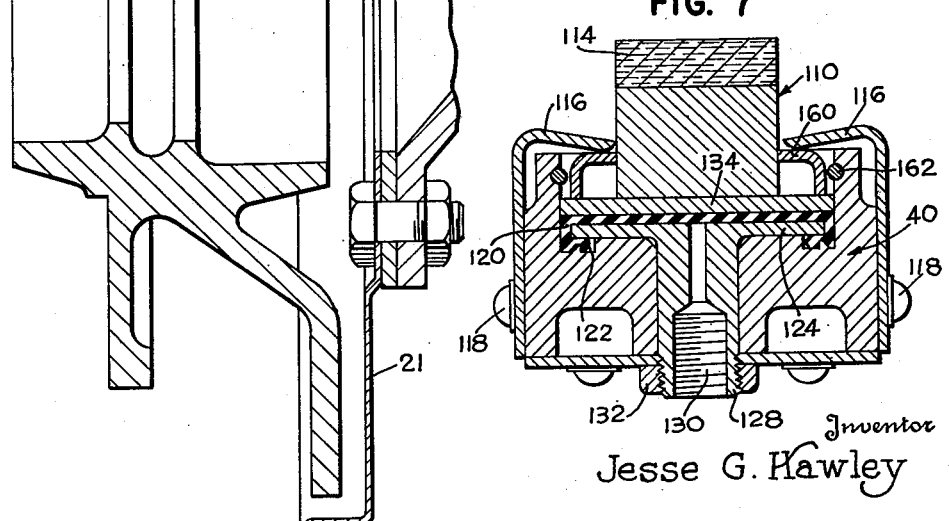
Inventor
Jesse G. Hawley
By Oldham & Oldham
ATTORNEYS

Patented Oct. 21, 1952

2,614,662

UNITED STATES PATENT OFFICE 2,614,662

SINGLE-DISK SPOT-TYPE BRAKE WITH ONE POINT ADJUSTMENT

Jesse G. Hawley, Painted Post, N. Y., assignor to Hawley Brake Corporation, Corning, N. Y., a corporation of New York Application November 25, 1949, Serial No. 129,566

12 Claims. (Cl. 188—72)

This invention relates to single-disc, spot-type brakes, and, more particularly, is concerned with brakes of this type adapted for hard, continuous usage on automobile and light vehicles, and characterized by a single point brake adjustment.

It has been known heretofore to employ hydraulically operated spot-type brakes for braking single disc means associated with a vehicle wheel. Such known brakes are ordinarily too expensively and heavily built to render them practical from a cost and weight standpoint for operations upon lightweight automobiles or similar vehicles. Additionally, known brakes are usually not capable of having a mechanically operated parking brake associated therewith, and, often, adjustment for wear and hydraulic cylinder leakage offers complications from a standpoint of construction and maintenance. The absorption of torque during braking has offered problems, as well as housing deflection.

A number of the difficulties and objections noted are believed to be overcome by the improved brake disclosed and claimed in my U. S. patent application, Serial No. 89,197, filed April 23, 1949, and entitled, "Single-Disc, Spot-Type Brake," now abandoned. The present application comprises a further improvement upon the brake disclosed and claimed in my identified application.

It is the general object of my invention to provide a single-disc, spot-type brake, capable of being operated hydraulically and/or mechanically, and characterized by simplicity and inexpensiveness of manufacture and by durability, reliability, smoothness, and long life in use.

Another object of my invention is the provision of a brake of the character described and including inboard and outboard plate portions adapted to engage with opposite sides of the rotary disc, the plates being connected by bolts which are slidably mounted upon a fixed torque plate, all of the bolts being simultaneously adjustable as to effective lengths whereby adjustments for brake wear are simplified and rendered uniform.

Another object of my invention is to provide a spot-type brake unit having inboard and outboard portions connected together by a plurality of bolts and including a spacer screw, the screw and bolts being simultaneously adjusted by gear means from a single point.

Another object of my invention is the provision of a brake of the type described wherein visible and audible clicker means are or may be associated with the assembly whereby brake adjustments can be quickly and accurately made, including the exact determination of clearances between the rotary brake disc and blocks of friction material adapted to be engaged therewith.

For a better understanding of my invention, reference should be had to the accompanying drawings wherein Fig. 1 is a rear elevation looking at the inboard side of the brake including the mechanical parking brake;

Fig. 5 is a rear elevation, partially in section, of the brake without the mechanical parking brake attachment and with the gear case cover removed;

Fig. 6 is a vertical cross-sectional view taken on line 6—6 of Fig. 5;

Fig. 7 is a horizontal cross-sectional view taken on line 7—7 of Fig. 5; and

Fig. 8 is an enlarged fragmentary view in cross-section of the visible and audible clicker means associated with the brake to indicate adjustment.

Figure 1:
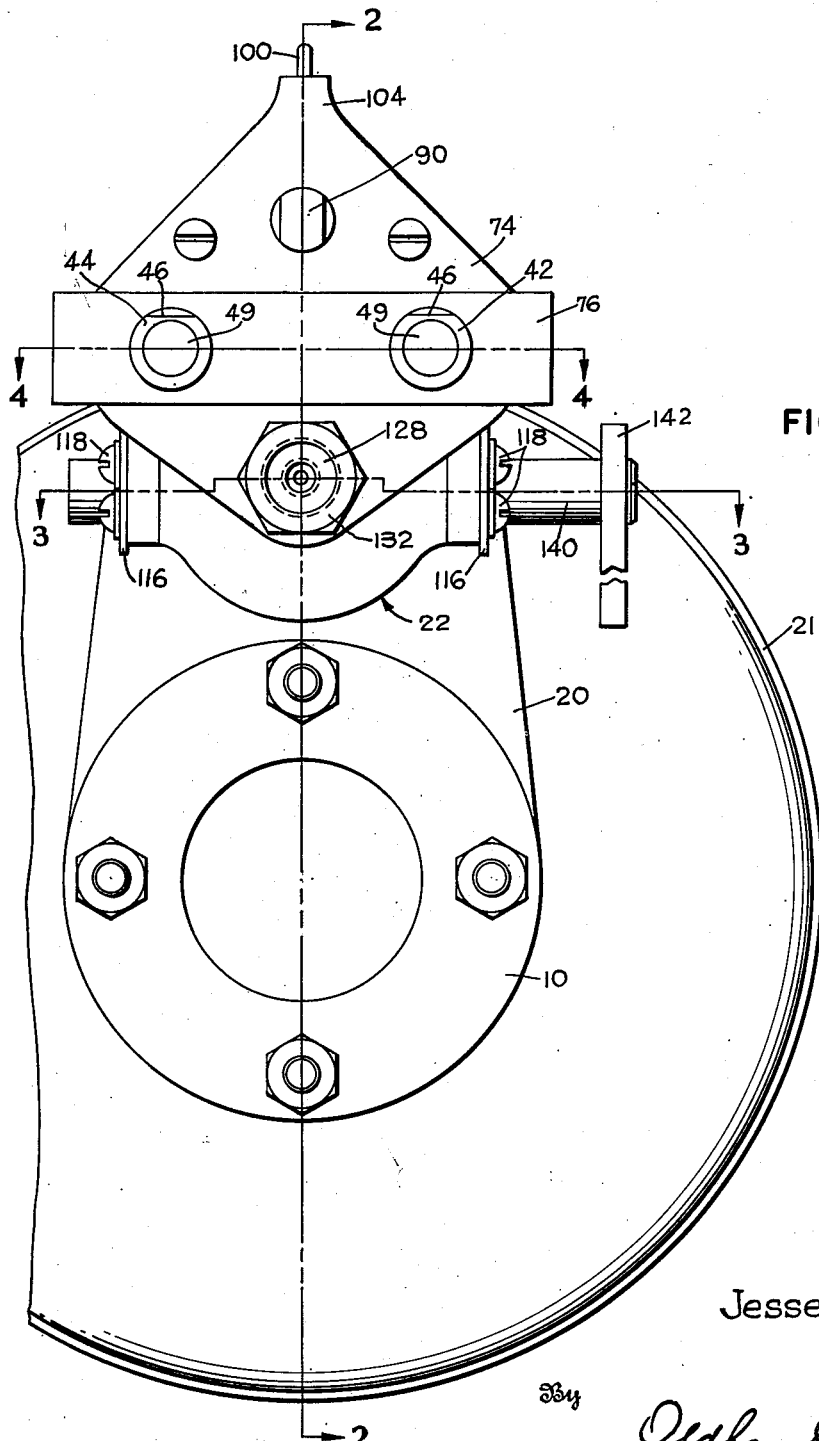

Having more particular reference to the drawings, the numeral 10 indicates fixed bracket which is adapted to be secured to or formed with a fixed axle or axle housing (not shown). Mounted for rotatable association with the fixed bracket 10 is a wheel hub 12 removably mounting a wheel 14 to which is secured, for example, a rim 16 adapted to removably support a pneumatic tire. The wheel hub 12 carries a brake disc 18, usually of cast iron, which is formed integral with or is secured to the wheel hub.

Secured to the bracket 10 is a torque plate 20 which extends usually in a vertical direction adjacent the inboard side of the brake disc 18, and with the torque plate including a plurality of bushed openings through which parts of the brake unit, indicated as a whole by the numeral 22, extend, all as hereinafter described in greater detail. The torque plate 20 may carry a round dish-like shield 21. At a point radially beyond the outer periphery of the brake disc 18, the torque plate 20 carries a pair of bushings 24 and 26 (see Fig. 4), these bushings slidably receiving bolts 28 and 30.

Secured to the outboard end of the bolts 28 and 30, as by heads 32 on the bolts, is an outboard plate, indicated as a whole by the numeral 34, and having a radially inwardly directed portion 36 extending into proximity with an arcuately short portion of the outboard side of the brake disc 18. The inwardly extending portion 36 of the outboard plate 34 carries a round, or substantially round, block of friction material 38. The heads 32 of the bolts 28 and 30 are locked against rotation by casting a boss on the outboard plate 34 or by means of a U-shaped bracket 37 secured by a screw 39, as best seen in Fig. 4.

Figure 4:
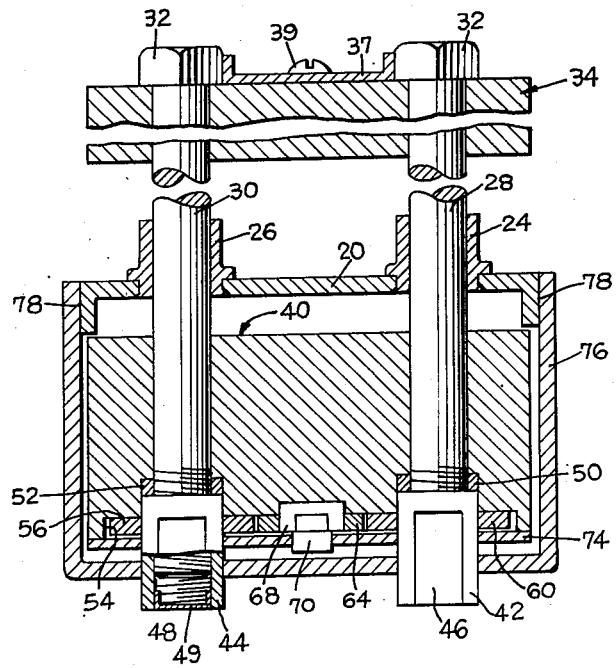
Fig. 4 is a horizontal cross-sectional view taken on line 4—4 of Fig. 1.

Mounted upon the other or inboard ends of the bolts 28 and 30 is an inboard plate, indicated as a whole by the numeral 40, and as best seen in Fig. 4, the bolts 28 and 30 are formed with rather long cylindrical nuts 42 and 44 having flats 46 and 48 respectively. To prevent entry of dirt, the ends of the nuts are closed with caps 49. Bronze, steel, or other insert bearings 50 and 52 may be positioned between the nuts 42 and 44 and the inboard plate 40 to reduce wear of the parts, particularly inasmuch as the inboard plate 40, as well as the outboard plate 34, is usually made from aluminum castings.

In a recess or gear cavity 54 in the inboard side of the inboard plate 40, as best seen in Figures 4 and 5, are mounted a plurality of gears. Specifically, a gear 56 having a flat 58 engaging with the flat 48 is mounted on the nut 44, and a gear 60 having a flat 62 engaging with the flat 46 is mounted on the nut 42. Positioned between the gears 56 and 60, and engaging therewith is a gear 64 which is secured by a flat 66 to a boss 68 formed with a stud 70, and with the boss being received in a socket 72 formed on the inboard side of the inboard plate 40. The stud 70 and the cylindrical nuts 42 and 44 of the bolts 28 and 30 extend through a gear cover plate 74 which is secured by rivets or screws to the inboard face of the inboard plate 40 to prevent endwise movement of the gears 56, 60, and 64 out of the gear case cavity 54.

The cylindrical nuts 42 and 44 of the bolts 28 and 30 also extend out through suitable openings in a U-shaped yoke 76 secured at 78 to the torque plate 20. This is an important feature of the invention inasmuch as the brake unit 22 is thereby given several points of spaced support axially of the brake disc 18, but with the brake unit 22, including the outboard plate 34, the inboard plate 40, the bolts 28 and 30, and their nuts 42 and 44 being free to slide upon the torque plate 20, its bushings 24 and 26 and the U-shaped yoke 76 toward and from the brake disc 18 during the applications of the brake, as hereinafter more particularly described.

Also mounted in the gear cavity 54 at the inboard end of the inboard plate 40 is a gear 86 which meshes with the top of the gear 64, the gear 86 having flats 88 engaging with flats 89 on a screw 90 received in a suitably tapped opening 92 in the inboard plate 40, and with the screw having a rounded end 94 bearing against a bearing insert 96 carried in the outboard plate 34. A lock nut 97 mounted on the screw 90 is adapted to be turned down against the inboard plate 40 to lock the gear assembly after adjustment.

Now looking at Fig. 5, and particularly the arrows shown on the gears 56, 60, 64, and 86, it will be recognized that rotation of the gear 86 in a counter-clockwise direction, by means of a wrench applied to the flats 89 of the screw 90, will rotate the gears 56 and 60 in a counter-clockwise direction. If the screw 90 is made with a righthand thread, then the bolts 28 and 30 and the nuts 42 and 44 will be made with lefthand threads whereby rotation of the gears in the direction shown in the arrows in Fig. 5 will allow the outboard plate 34 and the inboard plate 40 to move closer together to compensate for brake wear. It is possible to make the screw 90 with a lefthand thread, and the bolts 28 and 30 with righthand threads, in which case the gear 86 must be turned in a clockwise direction to move the inboard and outboard plates towards each other to compensate for brake wear.

Figure 2:
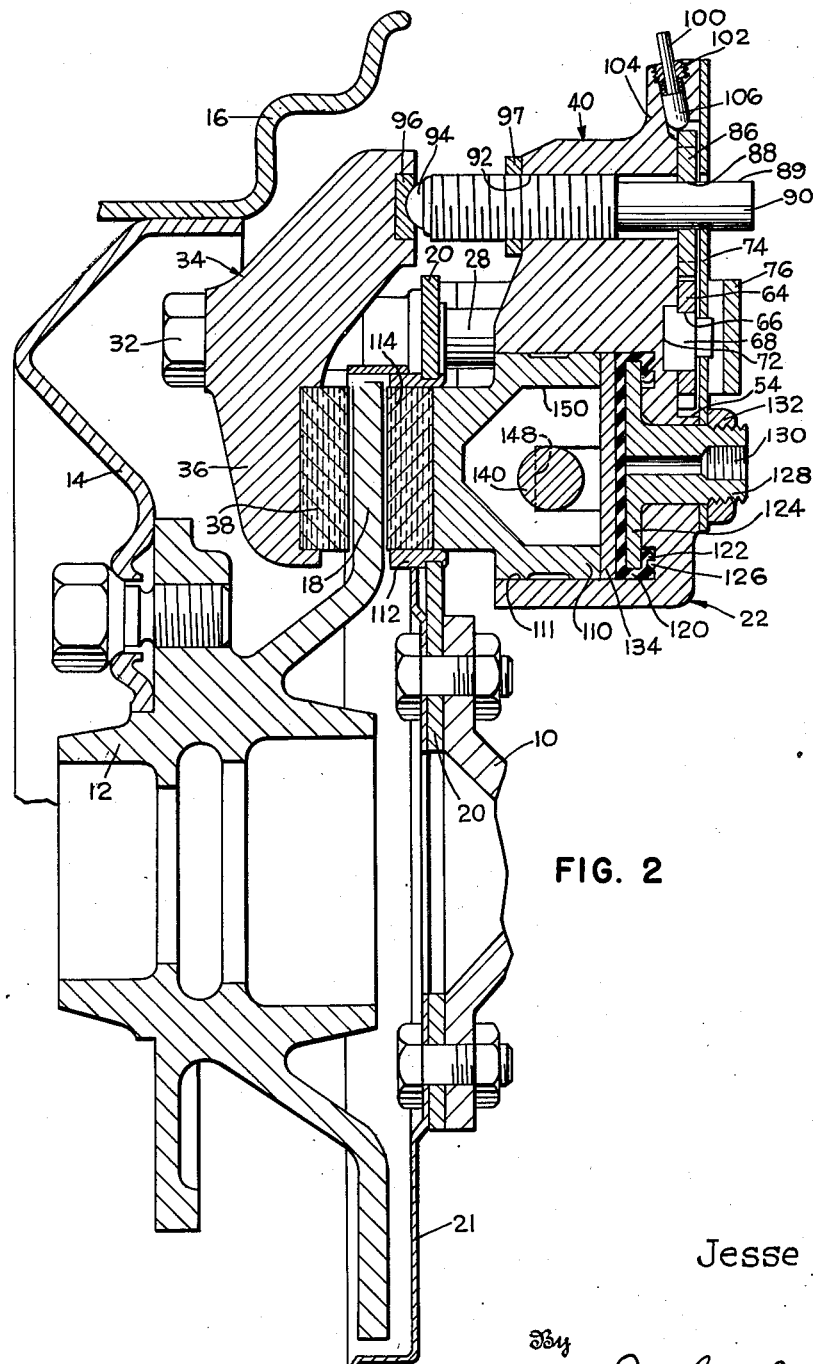
Fig. 2 is a vertical cross-sectional view taken on line 2—2 of Fig. 1.

Usually, but not necessarily associated with the gear 86, as best seen in Figures 2 and 8, are means for both visibly and audibly indicating brake adjustment. Such means may comprise a clicker pin 100 slidably carried in a bushing 102 received in a tapped opening at the top of the inboard side of the inboard plate 40 in an upwardly extending boss 104. Pin 100 is provided with a head 106 which is urged against the teeth of the gear 86 by means of a coiled compression spring 108. Thus, every time a gear tooth passes under the head 106, the spring 108 is compressed and the pin 100 moves upwardly to provide a visual indication of each tooth passing under the clicker pin. In addition, as each tooth passes under the head 106, the spring 108 snaps the head down into the space between adjacent teeth to give an audible click which can be heard by the person adjusting the brakes.

An important part of the invention is to form the screw 90 and the bolts 28 and 30 and their associated nuts 42 and 44 with threads having a particular form and pitch, for example, 20 threads per inch, and being a single thread, whereby brake adjustment is greatly simplified in that the screw 90 can be turned to bring the blocks of friction material up into contact with opposite sides of the disc 18 whereafter the screw 90 is rotated in the opposite direction, 4 clicks to thereby establish an exact brake clearance of .0125" inch between the blocks of friction material and the brake disc 18.

Figure 3:
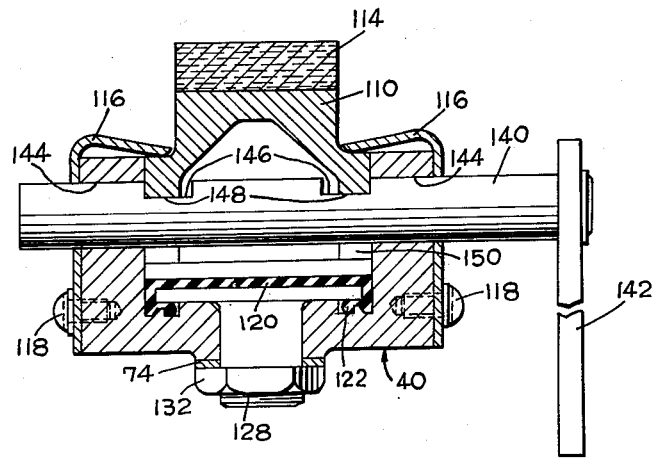
Fig. 3 is a horizontal cross-sectional view taken on line 3—3 of Fig. 1.

Completing the brake assembly, a piston 110 is slidably mounted in a cylinder 111 in the inboard plate 40, the piston being slidably received in a bushing 112 carried by the torque plate 20, and with the bushing 112 also slidably receiving a substantially round block 114 of friction material secured to the piston and adapted to engage with the brake disc 18 opposite to the block 38 of friction material carried by the outboard plate 34. As best seen in Fig. 3, the piston 110 is normally urged inwardly of the inboard plate 40 by means of spring fingers 116 secured by screws 118 to the sides of the inboard plate 40.

In the form of the invention illustrated in Figures 1 to 4, the piston 110 is adapted to be moved out towards braking engagement by either hydraulic or mechanical means. The hydraulic means includes a pulsator in the form of a rubber diaphragm 120 having an inwardly and backwardly turned flange 122 which is gripped between a metal disc 124 and a sealing rib 126 formed in the bottom of the cylinder 111. The disc 124 is formed integral with a conduit 128 having a threaded recess 130 to which a hydraulic line is adapted to be connected, and with the conduit 128 being secured to the inboard plate by a nut 132 engaging with the externally threaded end of the conduit and adapted to be tightened down against the cover plate 74 of the gear casing to thereby tightly draw the disc 124 against the inwardly turned flange 122 of the rubber diaphragm 120 to hold this flange against the sealing rib 126. A metal plate 134 is usually positioned between the rubber diaphragm 120 and the piston 110.

The mechanical means for actuating the piston 110 include a shaft 140, as seen in Fig. 3, having a lever 142 fastened to one end, and adapted to be secured to a brake cable (not shown), the other end of the brake cable extending, for example, to the emergency brake lever. The shaft 140 is rotatably received in suitable apertures 144 formed in the inboard plate 40, and the shaft 140 is provided with axially spaced flat portions 146 which are adapted to engage with flats 148 formed in the bottom of notches provided in the piston skirt 150 at diagrammatically opposed portions thereof. It will be evident that rotation of the lever 142 will move the shaft 140 through an arc to cause a camming action between the flats 146 and 148 to thereby move the piston 110 towards the brake disc 18 against the action of the springs 116.

As previously noted, the form of the invention illustrated in Figures 5, 6, and 7 is quite similar to the embodiment of the invention shown in the remaining figures of the drawings, except that the form of the invention of Figures 5, 6, and 7 does not include the mechanical cam means for actuating the pistons. In other words, on a four-wheeled vehicle, the rear wheel brakes only may be both mechanically and hydraulically actuated, and the front wheel brakes only hydraulically actuated, or vice-versa.

Fig. 7 best illustrates the differences in construction, with the piston 110 of the assembly being simplified, if desired, to eliminate the skirt 150. A filler plate 160 is then utilized instead, and against which the springs 116 engage, and with a snap ring 162 being carried by the inboard plate 40, which snap ring 162 engages with the plate or disc 134 to prevent movement of the plate to a point which would permit rupture of the rubber diaphragm 120. The shaft 140 prevents rupture of the diaphragm 120 when the mechanical operating means are incorporated with the brake. To facilitate removal of the snap ring 162 upon disassembly of the parts, a threaded plug 164 may be provided beneath the snap ring in the inboard plate 40 which, when screwed into its tapped opening, will snap the snap ring out of place. Or a hole only may be provided in place of the plug 164 through which a screw driver or the like can be moved to punch out the snap ring.

It will be evident from the foregoing description that the various objects of my invention have been achieved by the provision of a relatively simple, inexpensive, and yet highly efficient and practical brake for vehicles and the like and characterized by a single point or screw adjustment of each brake unit. Visible and audible indicating means may be associated with the assembly for facilitating quick and accurate brake adjustment. The assembly includes torque plate and associated aligning means for preventing tilting of the spot-type brake unit. Additionally, one form of the invention has both hydraulic and mechanical means for actuating the brake to thereby eliminate the necessity for separate parking brake means.

While in accord with the patent statutes I have specifically illustrated and described one best known embodiment of my invention, it is to be particularly understood that I am not to be limited thereto or thereby, but that the scope of my invention is defined in the appended claims.

I claim:

1. The combination in a brake assembly of a fixed bracket, a wheel rotatably mounted in association with the bracket, a brake disc carried by the wheel, a torque plate fixed to the bracket, a pair of bolts slidably mounted on the torque plate and positioned parallel to the wheel axis just radially outside of the outer periphery of the disc, an outboard plate carried at one end of the bolts and having a radially inwardly directed portion opposed to an arcuately short portion of the brake disc, a block of friction material carried by the outboard plate portion, an inboard plate carried by the other end of the bolts, a hydraulically actuated piston carried by the inboard plate and having a portion extending slidably through a bushed opening in the torque plate into proximity to said arcuately short portion of the opposite side of the brake disc, a block of friction material carried by the piston, a screw positioned between the outboard and inboard plates radially outside the bolts, gear means interconnecting the bolts and screw to provide a one point adjustment for brake wear, a clicker pin for visibly and audibly indicating adjustment, said torque plate including an extension slidably supporting the bolts beyond the inboard plate, and mechanical cam means for moving the piston independently of the hydraulic means.

2. The combination in a brake assembly of a fixed bracket, a wheel rotatably mounted in association with the bracket, a brake disc carried by the wheel, a torque plate fixed to the bracket, a pair of bolts slidably mounted on the torque plate and positioned parallel to the wheel axis just radially outside of the outer periphery of the disc, an outboard plate carried at one end of the bolts and having a radially inwardly directed portion opposed to an arcuately short portion of the brake disc, a block of friction material carried by the outboard plate portion, an inboard plate carried by the other end of the bolts, a hydraulically actuated piston carried by the inboard plate and having a portion extending slidably through a bushed opening in the torque plate into proximity to said arcuately short portion of the opposite side of the brake disc, a block of friction material carried by the piston, a screw positioned between the outboard and inboard plates radially outside the bolts, gear means interconnecting the bolts and screw to provide a one point adjustment for brake wear, and a clicker pin for visibly and audibly indicating adjustment, said torque plate including an extension slidably supporting the bolts beyond the inboard plate.

3. The combination in a brake assembly of a fixed bracket, a wheel rotatably mounted in association with the bracket, a brake disc carried by the wheel, a torque plate fixed to the bracket, a pair of bolts slidably mounted on the torque plate and positioned parallel to the wheel axis just radially outside of the outer periphery of the disc, an outboard plate carried at one end of the bolts and having a radially inwardly directed portion opposed to an arcuately short portion of the brake disc, a block of friction material carried by the outboard plate portion, an inboard plate carried by the other end of the bolts, a hydraulically actuated piston carried by the inboard plate and having a portion extending slidably through a bushed opening in the torque plate into proximity to said arcuately short portion of the opposite side of the brake disc, a block of friction material carried by the piston, a screw positioned between the outboard and inboard plates radially outside the bolts, and gear means interconnecting the bolts and screw to provide a one point adjustment for brake wear.

4. The combination in a brake assembly of a fixed bracket, a wheel rotatably mounted in association with the bracket, a brake disc carried by the wheel, a torque plate fixed to the bracket, a pair of bolts slidably mounted on the torque plate and positioned parallel to the wheel axis just radially outside of the outer periphery of the disc, an outboard plate carried at one end of the bolts and having a radially inwardly directed portion opposed to an arcuately short portion of the brake disc, a block of friction material carried by the outboard plate portion, an inboard plate carried by the other end of the bolts, a hydraulically actuated piston carried by the inboard plate and having a portion extending into proximity to said arcuately short portion of the opposite side of the brake disc, a block of friction material carried by the piston, a screw positioned between the outboard and inboard plates radially outside the bolts, and gear means interconnecting the bolts and screw to provide a one point adjustment for brake wear.

5. The combination in a brake assembly of a fixed bracket, a wheel rotatably mounted in association with the bracket, a brake disc carried by the wheel, a torque plate fixed to the bracket, a pair of bolts slidably mounted on the torque plate and positioned parallel to the wheel axis just radially outside of the outer periphery of the disc, an outboard plate carried at one end of the bolts and having a radially inwardly directed portion opposed to an arcuately short portion of the brake disc, a block of friction material carried by the outboard plate portion, an inboard plate carried by the other end of the bolts, a hydraulically actuated piston carried by the inboard plate and having a portion extending into proximity to said arcuately short portion of the opposite side of the brake disc, a block of friction material carried by the piston, a screw positioned between the outboard and inboard plates radially outside the bolts, gear means interconnecting said bolts and screw, and mechanical cam means for moving the piston independently of the hydraulic means.

6. A single-disc, spot-type brake comprising a rotary disc, a fixed bracket, a torque plate carried by the bracket, a brake unit slidably carried by the torque plate for movement toward and from the disc, the brake unit including an outboard plate engaging with the outboard side of the disc, an inboard plate, hydraulic means carried by the inboard plate and adapted to engage with the inboard side of the disc, bolt means connecting the inboard and outboard plates together, gear means for simultaneously adjusting the bolt means to adjust clearance with the disc, and visible and audible means for indicating brake clearance.

7. A single-disc, spot-type brake comprising a rotary disc, a fixed bracket, a torque plate carried by the bracket, a brake unit slidably carried by the torque plate for movement toward and from the disc, the brake unit including an outboard plate engaging with the outboard side of the disc, an inboard plate, hydraulic means carried by the inboard plate and adapted to engage with the inboard side of the disc, bolt means connecting the inboard and outboard plates together, and gear means for simultaneously adjusting the bolt means to adjust clearance with the disc.

8. A single-disc, spot-type brake comprising a rotary disc, a fixed bracket, a torque plate carried by the bracket, a brake unit slidably carried by the torque plate for movement toward and from the disc, the brake unit including an outboard plate engaging with the outboard side of the disc, an inboard plate, hydraulic means carried by the inboard plate and adapted to engage with the inboard side of the disc, bolt means connecting the inboard and outboard plates together, gear means for simultaneously adjusting the bolt means to adjust clearance with the disc, visible and audible means for indicating brake clearance, and mechanical cam means carried by the inboard plate and adapted to engage with the inboard side of the disc.

9. A single-disc, spot-type brake comprising a rotary disc, a fixed bracket, a torque plate carried by the bracket, a brake unit slidably carried by the torque plate for movement toward and from the disc, the brake unit including an outboard plate engaging with the outboard side of the disc, an inboard plate, hydraulic means carried by the inboard plate and adapted to engage with the inboard side of the disc, bolt means connecting the inboard and outboard plates together, unitary acting means for simultaneously adjusting the bolt means to adjust clearance with the disc, and mechanical cam means carried by the inboard plate and adapted to engage with the inboard side of the disc.

10. The combination in a brake assembly of a fixed bracket, a wheel rotatably mounted in association with the bracket, a brake disc carried by the wheel, a torque plate fixed to the bracket, a pair of bolts slidably mounted on the torque plate and positioned parallel to the wheel axis just radially outside of the outer periphery of the disc, an outboard plate carried at one end of the bolts and having a radially inwardly directed portion opposed to an arcuately short portion of the brake disc, a block of friction material carried by the outboard plate portion, an inboard plate carried by the other end of the bolts, a hydraulically actuated piston carried by the inboard plate and having a portion extending into proximity to said arcuately short portion of the opposite side of the brake disc, a block of friction material carried by the piston, and a screw positioned between the outboard and inboard plates radially outside the bolts to aid in maintaining the said plates in spaced relation.

11. A brake assembly for braking a wheel on a vehicle including a brake disc carried by the wheel, a torque plate secured to the vehicle, a brake unit slidably carried by the torque plate for movement toward and from the disc, the brake unit including an outboard plate engaging with the outboard side of the disc, an inboard plate, hydraulic means carried by the inboard plate and adapted to engage with the inboard side of the disc, a pair of bolt means connecting the inboard and outboard plates together, and unitary acting means for simultaneously adjusting the bolt means connected between the bolt means to adjust clearance with the disc.

12. A brake assembly for braking a wheel on a vehicle including a brake disc carried by the wheel, a torque plate secured to the vehicle, a brake unit slidably carried by the torque plate for movement toward and from the disc, the brake unit including an outboard plate engaging with the outboard side of the disc, an inboard plate, hydraulic means carried by the inboard plate and adapted to engage with the inboard side of the disc, and adjustable means connecting the inboard and outboard plates together to adjust clearance with the disc, said adjustable means including a plurality of axially directed members, and means connecting said members together for unitary adjustment action.

JESSE G. HAWLEY.

REFERENCES CITED

The following references are of record in the file of this patent:

UNITED STATES PATENTS

| Number | Name | Date |
| --- | --- | --- |
| 2,319,231 | Hawley | May 18, 1943 |
| 2,351,041 | Hawley | June 13, 1944 |
| 2,548,008 | Franklin | Apr. 10, 1951 |